United States Patent [19]

Sekiguchi et al.

[11] Patent Number: 5,450,584
[45] Date of Patent: Sep. 12, 1995

[54] APPARATUS AND METHOD FOR AUTOMATIC TRANSFER OF DATA BASE INFORMATION IN RESPONSE TO LOAD DISTRIBUTION AMONG INTERCONNECTED TERMINAL STATIONS

[75] Inventors: Kouichi Sekiguchi; Yojiro Morimoto; Miho Muranaga, all of Yokohama; Yoshikazu Yamashita, Tokyo, all of Japan

[73] Assignee: Kabushiki Kaisha Toshiba, Kawasaki, Japan

[21] Appl. No.: 270,785

[22] Filed: Jul. 5, 1994

Related U.S. Application Data

[63] Continuation of Ser. No. 24,901, Mar. 1, 1993, which is a continuation of Ser. No. 411,027, Sep. 22, 1989, abandoned.

[30] Foreign Application Priority Data

Sep. 30, 1988 [JP] Japan .................. 63-246434

[51] Int. Cl.6 .................................. G06F 13/38
[52] U.S. Cl. ..................... 395/650; 395/600; 395/200.03; 364/DIG. 1
[58] Field of Search ............... 395/600, 800, 650, 200

[56] References Cited

U.S. PATENT DOCUMENTS

| | | | |
|---|---|---|---|
| 3,702,006 | 10/1972 | Page | 395/650 |
| 4,099,235 | 7/1978 | Hoschler et al. | 395/425 |
| 4,403,286 | 9/1983 | Fry et al. | 395/650 |
| 4,432,057 | 2/1984 | Daniell et al. | 395/725 |
| 4,633,387 | 12/1986 | Hartung et al. | 395/650 |
| 4,656,658 | 4/1987 | King | 379/221 |
| 4,748,558 | 5/1988 | Hirosawa et al. | 395/650 |
| 4,825,354 | 4/1989 | Agrawal et al. | 395/600 |
| 4,839,798 | 6/1989 | Eguchi et al. | 395/650 |
| 4,887,204 | 12/1989 | Johnson et al. | 395/600 |
| 4,974,192 | 11/1990 | Face et al. | 395/275 |
| 5,008,853 | 4/1991 | Bly et al. | 395/153 |
| 5,012,405 | 4/1991 | Nishikado et al. | 395/600 |
| 5,031,089 | 7/1991 | Liu et al. | 395/725 |
| 5,046,002 | 9/1991 | Takashi et al. | 395/600 |
| 5,053,950 | 10/1991 | Naganuma et al. | 395/375 |

FOREIGN PATENT DOCUMENTS 01166230 6/1989 Japan .

OTHER PUBLICATIONS

Eager et al., "Adaptive Load Sharing in Homogeneous Distributed Systems", *IEEE Transactions on Software Engineering*, vol. SE-12, No. 5, May 1986, pp. 662–675.

Alonso et al., "Sharing Jobs Among Independently Owned Processors", *8th International Conference on Distributed Computer Systems*, IEEE, Jun. 13–17, 1988, 7 pages.

Sacca & Wiederhold, ACM Transactions on Database Systems, vol. 10, No. 1, Mar. 1985, Title: "Database Partitioning in a Cluster of Processors".

"File Placement on Distributed Computer Systems", Computer, vol. 17, No. 1, Jan. 1984, IEEE Long Beach, Calif., B. W. Wah, pp. 23–32.

"Design and implementation of a distributed transaction processing system", COMPCON '88, IEEE, New York, D. N. Mannai et al, Mar. 4, 1988, pp. 185–188.

"Decentralized resource allocation for distributed systems", IEEE INFOCOM '87. The Conference on Computer Communications, Mar. 31–Apr. 2, 1987, pp. 328–336.

*Primary Examiner*—William M. Treat
*Attorney, Agent, or Firm*—Oblon, Spivak, McClelland, Maier & Neustadt

[57] ABSTRACT

A distributed data-base communication network system includes a plurality of terminal stations which respectively contain data-base devices and which are associated with one another by means of data communication lines. A data-base management apparatus is provided in each of these stations and includes an internal load monitor device for monitoring the accessing load of the internal data-base device of the internal station and an external load monitor device for monitoring the accessing loads of the data-base devices of the external terminal stations. A data-base load distribution management device is connected to the monitor devices, and automatically transfers at least part of the data-base information of the internal data-base device to a selected one of the external terminal stations when the internal database accessing load has exceeded the maximum permissible level, thus enhancing the uniformity of distribution of the data-base load of the communication network.

17 Claims, 4 Drawing Sheets

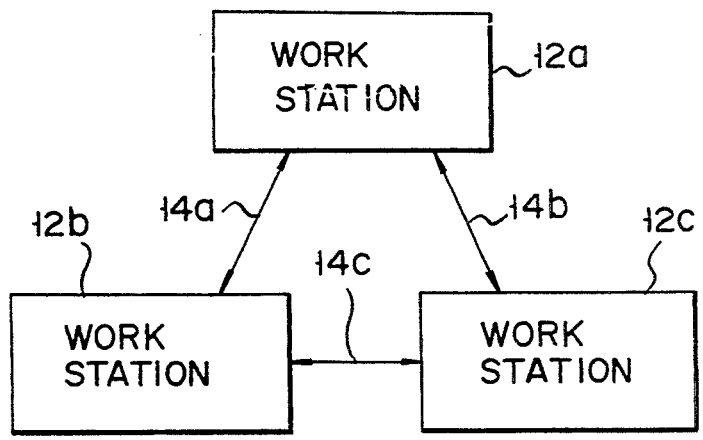
F I G. 1
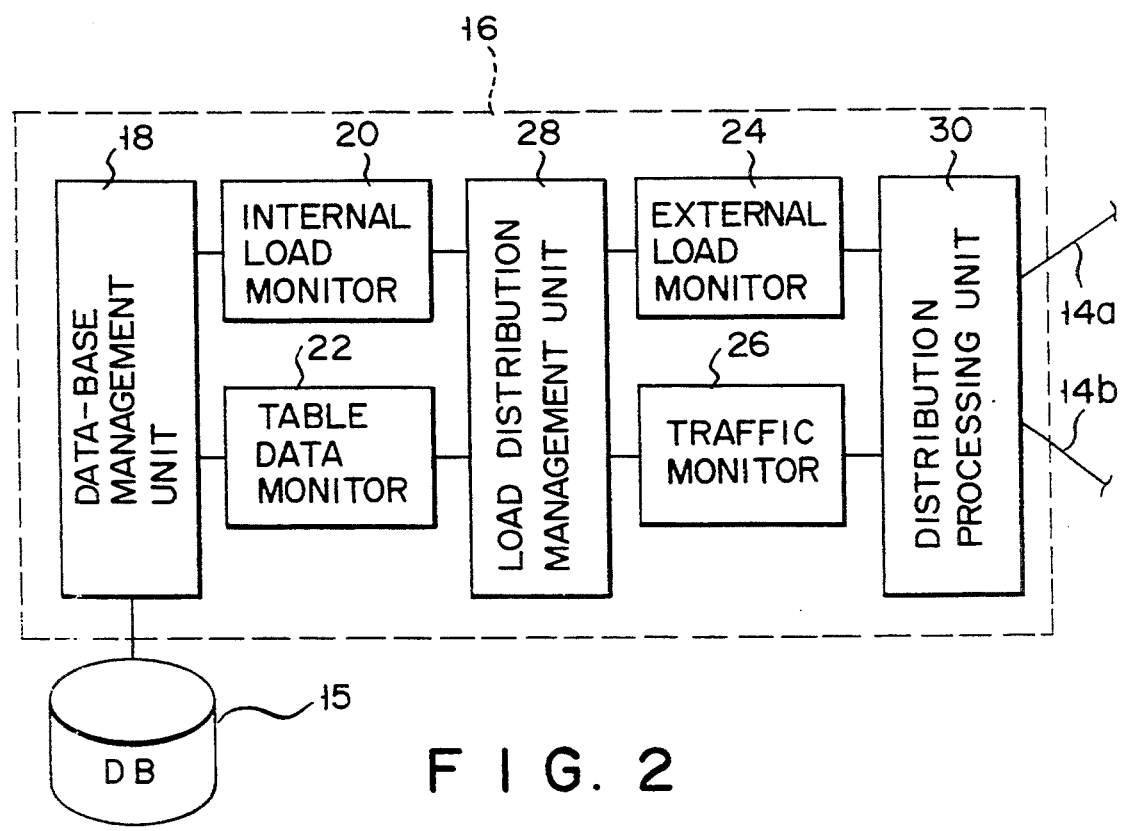
F I G. 2

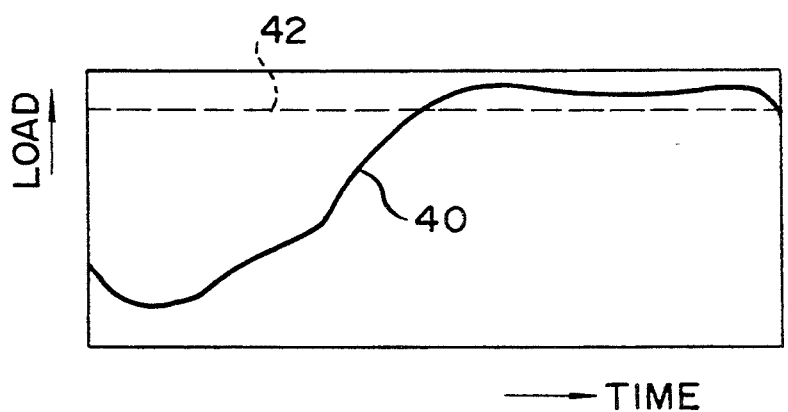
F I G. 3
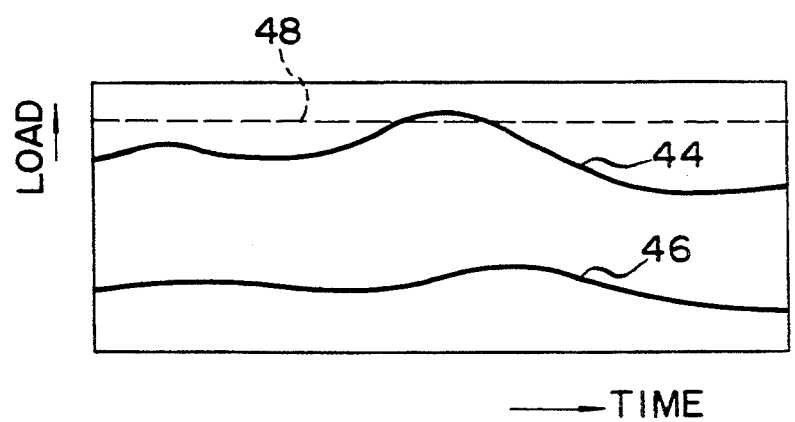
F I G. 4
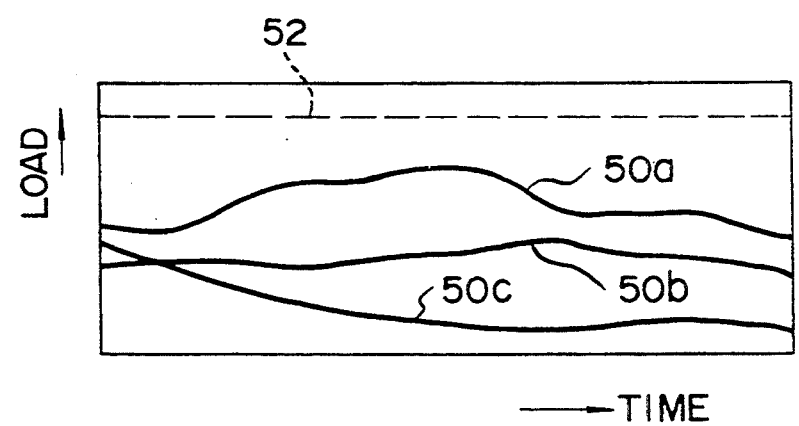
F I G. 5

ND METHOD FOR AUTOMATIC
APPARATUS AND METHOD FOR AUTOMATIC TRANSFER OF DATA BASE INFORMATION IN RESPONSE TO LOAD DISTRIBUTION AMONG INTERCONNECTED TERMINAL STATIONS

This application is a Continuation of application Ser. No. 08/024,901, filed on Mar. 1, 1993, which is a Continuation of application Ser. No. 07/411,027, filed on Sep. 22, 1989, now abandoned.

BACKGROUND OF THE INVENTION

1. Field of the Invention

The present invention relates to a communication network system for digital data distribution including terminal stations or work stations connected to one another by means of digital data transmission lines, and more particularly to a data-base managing architecture for automatically distributing an accessing load among the work stations by use of a distributed data-base management device for data distribution provided in each of the stations.

2. Description of the Related Art

Recently, a distributed data communication network system has received much more attention in place of a centralized data communication network system. In the centralized data communication network system, a host computer is used to control/manage data communication between work stations associated therewith. In contrast, in the distributed data communication network system, a distributed data-base management device is provided in each of the work stations, which controls data communication between the terminal station containing this management device and a terminal station or stations associated therewith. Therefore, each terminal may effect mutual data communication with a desired destination terminal independently of the other terminals.

A data-base network system can be given as one example of systems which most positively adopt the concept of data communication network. In this case, an internal data-base unit is provided in each of local work stations subscribed to the data-base system. The data-base unit can be freely accessed by not only the station (self station) containing the data-base unit but also any one of the remaining stations (external stations). In this sense, it is safe to say that information of the data-base unit of each station can be shared as the common information source by all the stations subscribed to the system.

In the conventional distributed data communication network system, however, it is extremely difficult to effectively perform the mutual access to data-base at a high response speed. One of the important reasons is that the data-base accessing load between the stations is not uniform. More specifically, when accessing requests of a number exceeding the load permissible level for the data-base of a certain work station are supplied from the other stations to the data-base of the certain work station, for example, it becomes impossible to effect rapid data communication therebetween. Particularly, in the conventional system, only one measure can be taken to cope with the above difficulty, and in this case, the operator uses a predetermined software command of an operating system to transfer at least part of data-base information of the certain station to another station whose load is now relatively small, thus distributing the data-base load. With such a manual load distribution management, it is almost impossible to fully cope with the continual change of the accessing load of the data communication.

SUMMARY OF THE INVENTION

It is therefore an object of the present invention to provide a new and improved distributed data-base managing architecture which can be preferably applied to a distributed data-base system to automatically and adequately effect the load distribution of data-base devices provided at sites, thus attaining effective data-base accessing.

In accordance with the above object, the present invention is addressed to a specific data-base management apparatus which is provided in each of terminal stations respectively containing data-base devices and associated with one another by means of communication lines in a distributed data-base communication system. The data-base management apparatus includes a first monitor device for monitoring the accessing load of an internal data-base device and a second monitor device for monitoring the accessing loads of data-base devices of external work stations. The data-base management device is connected to the first and second monitor devices. When the internal data-base accessing load has exceeded the maximum permissible level, the data-base management device automatically transfers at least part of the data-base information of the internal data-base device to a selected one of the external terminal stations, thus speeding up uniform distribution of the data-base load of the system.

The present invention, its objects and advantages will become more apparent in the detailed description of a preferable embodiment presented below.

BRIEF DESCRIPTION OF THE DRAWINGS

In the detailed description of a preferred embodiment of the present invention presented below, reference is made to the accompanying drawings of which:

FIG. 1 is a diagram schematically showing the entire construction of a distributed data-base communication network system according to a preferable embodiment of the present invention;

FIG. 2 is a block diagram showing the internal structure of each of work stations of FIG. 1;

FIGS. 3 to 5 are model graphs showing the monitoring results obtained by monitor devices shown in FIG. 2.

DETAILED DESCRIPTION OF THE PREFERRED EMBODIMENTS

Figure 6A:
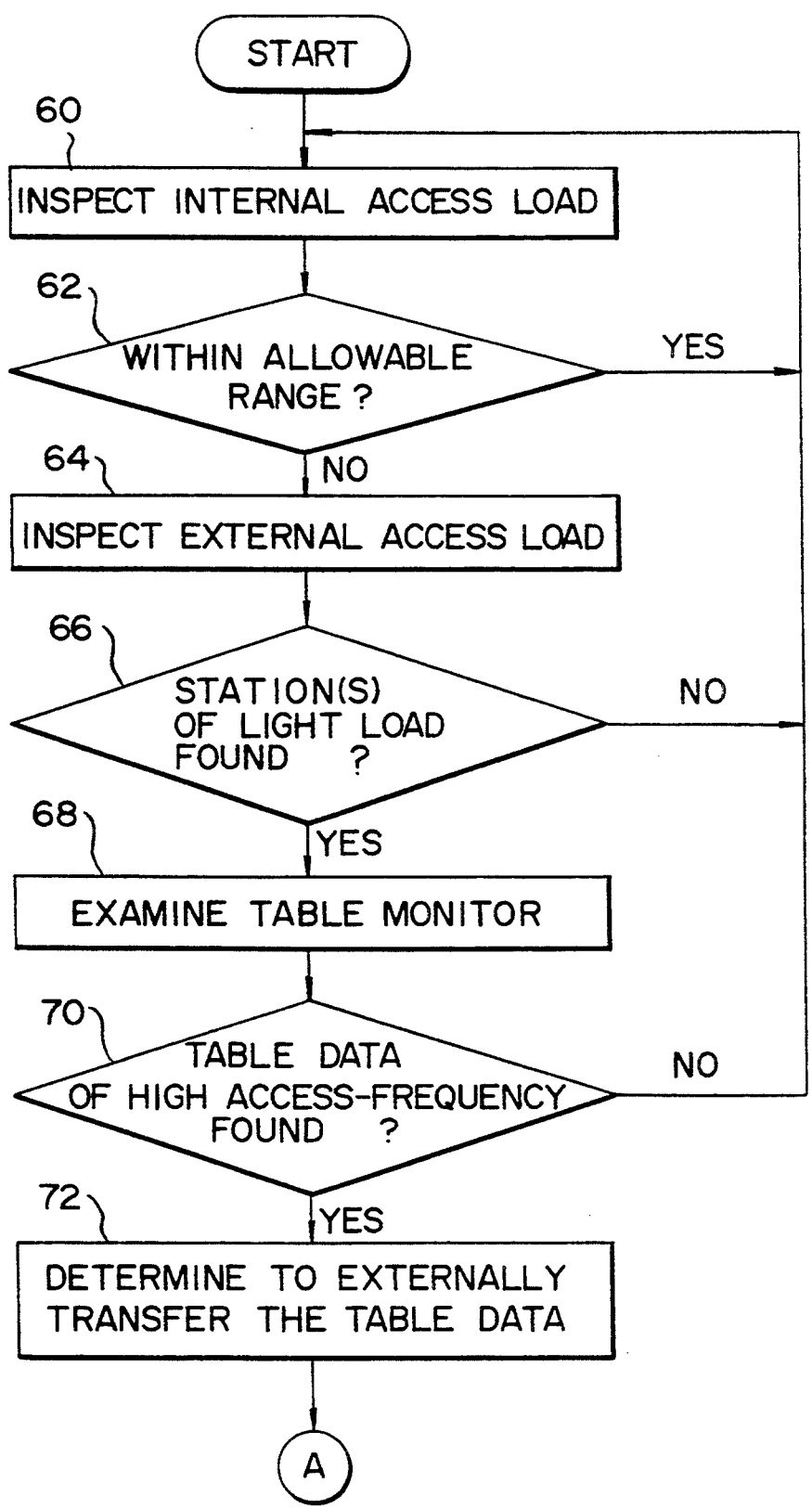
FIGS. 6A and 6B are a flowchart showing the automatic data-base distribution management process effected by a load distribution management unit shown in FIG. 1.

Referring now to FIG. 1, a distributed data-base communication network system according to a preferable embodiment of the present invention is generally designated by a reference numeral "10", wherein a plurality of terminal stations 12 are connected to one another by means of respective exclusive communication lines such as digital data transmission lines. The terminal stations 12 may be variously referred to as "data-base stations", "work stations", "subscriber stations", "local stations" or "sites"; in this description, the term "work stations" is used as a common name of these terminal stations. It should be noted that, although only three work stations 12a, 12b and 12c are illustrated in FIG. 1 simply for brevity of the drawing, a larger number of work stations may be incorporated into this system as required.

As shown in FIG. 1, each of the work stations 12a, 12b and 12c is independently connected to the remaining ones of the work stations 12 via digital data transmission/communication lines 14a, 14b and 14c. For example, the work station 12a is connected to the work station 12b via the data communication line 14a, and at the same time connected to the work station 12c via the data communication line 14b. With this connection, any one of the work stations can be freely communicated with the other work stations associated therewith.

As shown in FIG. 2, each of the work stations 12 includes data-base section 15 and data-base/data communications control section 16. The data-base section 15 may be a programmable data storage device of a large capacity functioning as a data bank. A magnetic fixed disk memory device, optical disc memory device or the like may be preferably utilized to constitute the data-base device.

The control section 16 is connected to the data-base section 15 and includes a data-base management unit 18 for managing the transfer data and memory address in the data accessing operation of the data-base section 15. The data-base management unit 18 is connected to four monitoring devices 20, 22, 24 and 26, and a load distribution management unit 28. The load distribution management unit 28 is connected to a distributed processing control unit 30 for performing the distribution access control in the operation of exchanging data between the internal work station and the external work stations. Each of the stations 12 effects data exchange with the other work stations via the distributed processing controller 30.

In the system of FIG. 1, the explanation is further made assuming that the work station 12a takes a leading role in the system. For convenience, the station 12a is hereinafter referred to as an "self station". The monitor 20 functions as an internal load monitor for monitoring, on the real time base, the current access load of the data-base section 15 of the self work station 12a in which it is arranged. The monitor 22 is a table data monitor for monitoring table data of the data-base section 15. The monitor 24 is an external load monitor for monitoring the current access load of each of the other work stations 12b and 12c associated with the work station 12a on the real time base. The monitor 26 functions as a traffic monitor for monitoring the current traffic on the data communication lines 14 between the self station 12a and the other stations 12b and 12c on the real time basis. The load distribution management unit 28 selects or determines part of information stored in the data-base section 15 to be transferred and a target work station to which the selected part of information is transferred based on the monitor information of the monitors 20, 22, 24 and 26. The data-base management unit 18 reads out or writes table data transferred between the self work station 12a and the other work station or work stations from or into the data-base section 15 in response to the determination made by the load distribution management unit 28.

The result of the monitoring operation of the internal load monitor 20 is shown in FIG. 3 wherein the abscissa of the graph indicates time and the ordinate thereof indicates the load of the internal station. As is clearly seen from the graph, the load (which is hereinafter referred to as an "internal load") 40 of the self station 12a continually changes and the accessing to the database resources of the station 12a overflows when the load exceeds the maximum permissible level indicated by a broken line 42. At this time, an allocation queue occurs. The result of the monitoring operation of the external load monitor 24 is shown in FIG. 4. In the graph of FIG. 4, a solid line 44 indicates variation in the load of another station 12b, whereas a solid line 46 indicates variation in the load of the other station 12c. The maximum permissible level commonly set for the stations 12b and 12c is indicated by a broken line 48. In general, the maximum permissible level is set at the same level as the level 42. The external load monitor 24 provided in the self station 12a receives internal load monitoring results supplied from the internal load monitors 20 of the work stations 12b and 12c in real time, and uniformly manages them as "external loads". Since the internal load monitor 20 and external load monitor 24 are arranged in each work station 12, the current load conditions of the internal load and the external loads can be easily determined in any one of the work stations 12.

The result of the monitoring operation of the traffic monitor 26 of the self station 12a is shown in FIG. 4, wherein solid lines 50a, 50b and 50c indicate variations in the traffics on the data communication lines 14a, 14b and 14c between the work stations. The maximum permissible traffic level of the data communication lines 14a, 14b and 14c is shown by a broken line 52. In this example, the maximum permissible traffic level of each data communication line is set at the same level as those of the remaining data communication lines. Data of the monitoring result of the table data monitor 22 of the self station 12a is shown in the following table.

TABLE

| Name of Table Data | Service Condition | | | | |
|---|---|---|---|---|---|
| | Station A | Station B | Station C | Self Station | External Stations |
| A1 | 5 | 0 | 0 | 5 | 0 |
| A2 | 1 | 7 | 2 | 1 | 9 |
| A3 | 6 | 0 | 0 | 6 | 0 |

The table data monitor 22 monitors continually changing service conditions of table data, for example, table data A1, A2 and A3, of the data-base section 15 of the self station 12a in which it is arranged, and stores updated monitoring results therein.

For example, in the above Table, it is shown that the table data A1 has been accessed five times by the self station 12a and no access request from the external stations has occurred. Such an access condition can be rapidly informed by consulting the table data monitor 22. The monitor 22 further monitors the service conditions of table data for respective internal and external stations. For example, if the table data A2 has been accessed once by the self station 12a, accessed seven times by the external station 12b, and accessed two times by the external station 12c, then the monitoring result data of the table data monitor 22 clearly indicates that the data A2 has been accessed once by the self station 12a and accessed nine times in total by the external stations 12b and 12c as shown in the right side columns of the above Table. In this way, history information relating to which of the work stations 12 has generated a transaction which requires use of the table data and the number of times by which the table data has been used to date can be easily obtained by means of the table data monitor 22.

Figure 6B:
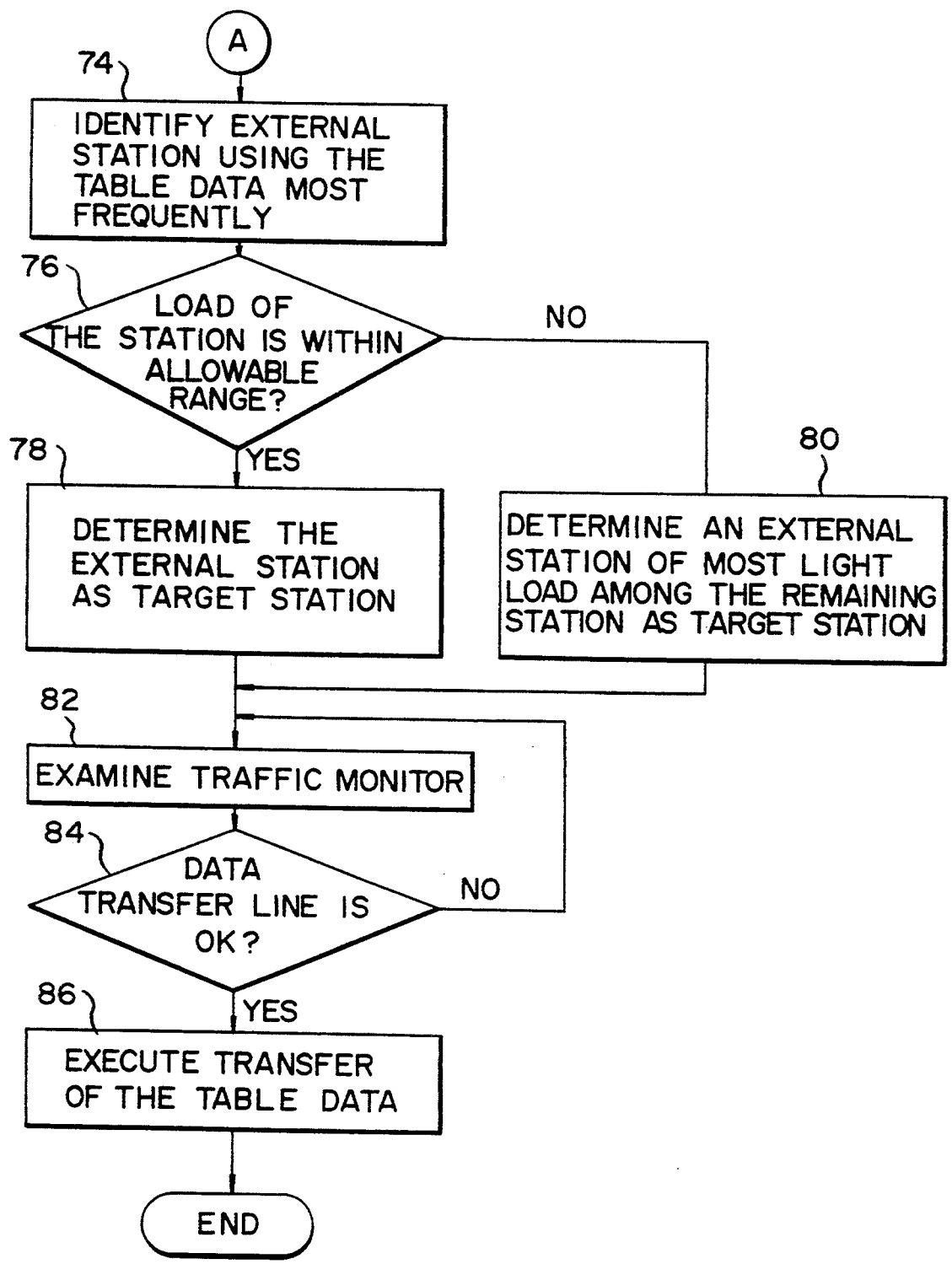

Now, the operation mode of the embodiment of the above construction is explained with reference to the flowchart shown in FIGS. 6A and 6B.

The load distribution management unit 28 of the work station 12a inspects the internal data-base accessing load condition of the station 12a at a step 60 and checks at a step 62 whether or not the internal load is below the maximum permissible level 42 (see FIG. 3). If it is detected that the internal load is within the allowable range as the result of consultation with the internal load monitor 20, the management operation is returned to the step 60.

If it is determined that the internal load is outside the allowable range, that is, the internal load of the self station 12a has exceeded the maximum permissible level 42 (overloaded), it consults with the external monitor 24 at a step 66 to inspect the load condition (external load condition) of the external stations 12b and 12c. At the step 66, it is checked whether or not a station having a load less than that of the self station 12a is present in the external stations 12b and 12c. If there is no such an external station, the operation is returned to the step 60. In contrast, if such an external station or external stations are detected, the load distribution management unit 28 determines that part (table data) of the stored information of the data-base section 15 of the internal station 12a should be transferred to a detected one of the external stations.

At this time, the table data to be transferred is determined based on information from the table data monitor 22 by the load distribution management unit 28 in the following manner. That is, at a step 70, the load distribution management unit 28 consults with the table data monitor 22 to check whether or not table data whose access-frequency (frequency in use) by the external stations 12b and 12c is higher than the access-frequency by the self station 12a is included in the table data items of the data-base of the self station 12a. If there is no such a table data, the operation is returned to the step 60. In contrast, if such a table data is detected, the load distribution management unit 28 determines at the step 72 that such a table data should be transferred to the exterior. For example, in a case where the monitor data of the table data monitor 22 is set in such a condition as shown in the above presented Table, the frequency in use (frequency in internal use) by the self station 12a which is "1" is smaller than the frequency in external use which is "9" only in the case of the table data A2 among the table data A1, A2 and A3 of the self station 12a. Therefore, in this case, the load distribution management unit 28 selects the table data A2 as data to be transferred.

Subsequently, at a step 74, the load distribution management unit 28 detects an external station which has used the selected table data most frequently. In this example, the station 12b is detected. This is because the station 12b has used the table data A2 of the station 12a most frequently (seven times) as shown in the above presented Table. At a step 76, monitor information of the table data monitor 22 is used in order to determine whether the load of the detected station 12b is within the allowable range or not. If the load of the detected station 12b is within the allowable range, the load distribution management unit 28 determines the station 12b as a "target station" to which the table data A2 is transferred. However, in this example, since the load of the external station 12b has exceeded the maximum permissible load level 48 as shown by the solid line 44 in FIG. 4, the load distribution management unit 28 immediately comes to recognize that the load of the station 12b is outside the allowable range. Therefore, in this case, at a step 80, the load distribution management unit 28 will determine that one of the remaining external stations which has the smallest load as the target station.

After the table data A2 to be transferred and the target station 12c have been determined as described above, the load distribution management unit 28 determines the transfer route. More specifically, the load distribution management unit 28 examines monitor information obtained from the traffic monitor 26 at a step 82 and checks at a step 84 whether the current traffic of the communication line 14b from the self station 12a to the target station 12c is below the maximum permissible traffic level or not. If "YES" in the step 84, data transfer is effected at a step 86. If "NO" in the step 84, the load distribution management unit 28 effects the operation of the step 82 again to examine another transfer route. The data transfer route from the station 12a to the station 12c includes two routes; one being given by the communication line 14b which directly connects the stations 12a and 12c to each other and the other being given by the communication lines 14a and 14c which connect the stations 12a and 12c to each other via the station 12b. Therefore, if the traffic on the communication route along the communication lines 14a and 14c is within the allowable range, then it is possible to select the communication route. Further, there are some cases wherein none of the communication routes which can be formed between the stations 12a and 12c are available. In such a case, the load distribution management unit 28 will repeatedly effect the above described communication route determination process.

With such an arrangement, the process of uniformly distributing the detected load and detecting the occurrence of the overload of the data-base access in the data-base communication network system 10 can be automatically and efficiently effected by means of the load distribution management unit 28 which cooperates with the four monitors 20, 22, 24 and 26. In particular, since, in each work station 12, the load condition of not only the internal load thereof but also the load of the external stations 12b and 12c associated therewith can be rapidly and precisely detected by means of the external load monitor 24, the target station can be rapidly determined. Further, since that one of the table data in the data-base information of the self station 12a which should be selected as table data to be transferred is determined according to the monitor information in such a manner as to automatically derive the table data which has been most frequently used, the uniformity of distribution can be held at the maximum level. Since the data transfer route to the selected "target station" is determined so as to contain as many communication lines whose traffics are relatively small as possible, the communication cost of the data transfer for distribution between the stations can be reduced.

Although the invention has been described with reference to a specific embodiment, it shall be understood by those skilled in the art that numerous modifications may be made that are within the spirit and scope of the invention.

For example, the "automatic data-base distribution management" concept of this invention may be applied to various types of data-base systems such as a relational data-base communication system and a knowledge base communication system. Further, the management operation of the load distribution management unit 28 is not limited to that shown in FIGS. 6A and 6B, and the detail thereof can be freely modified so as to meet the practical applications.

What is claimed is:

1. A data-base management apparatus provided in each of a plurality of terminal stations associated with one another by communication lines in a distributed data-base communication system and respectively having data-base devices each of which stores respective data-base information, said terminal stations including a certain terminal station and other terminal stations, said data-base devices including a first data-base device internally arranged in said certain terminal station, and second data-base devices in said other terminal stations, said apparatus comprising:

first monitor means for monitoring a first access load of said first data-base device of said certain terminal station, and for detecting whether the first access load exceeds a permissible level below which accessing to the data-base device does not overflow;

second monitor means for monitoring second access loads of said second data-base devices of said other terminal stations, and for detecting whether the second access loads exceed the permissible level; and data-base distribution manager means connected to said first and second monitor means, for determining whether the first access load of said certain terminal station exceeds the permissible level, for specifying, when the first access load exceeds the permissible level, when at least one of the second access loads in said other terminal stations does not exceed the permissible level, and when a part of the data-base information of said first data-base device has a high access frequency, the external transfer of the part of the data base information with a high access frequency, for identifying one of said other terminal stations most frequently using said part of the data-base information with a high access frequency, for transferring said part of the data-base information to the identified one of said other terminal stations which accesses said part most frequently when the second access load of the identified one of said other terminal stations is less than the permissible level, and for, when the second access load of said identified one of said terminal stations is not below said permissible level, transferring said part of the data-base information to one of said other terminal stations whose second access load is lightest among the remaining other terminal stations.

2. The apparatus according to claim 1, further comprising:

third monitor means for monitoring a use frequency of the data-base information of said first data-base device by monitoring a data table thereof, and for maintaining a history information thereof as monitor information; and said data-base distribution manager means specifying said part of data-base information to be externally transferred on the basis of the use frequency monitored by said third monitor means.

3. The apparatus according to claim 2, wherein said data-base distribution manager means detects a data-base information portion which is included in the data-base information of said first data-base device and which is externally accessed more frequently by said other terminal stations than is internally accessed by said certain terminal station and selects the detected data-base information portion as the part to be transferred.

4. The apparatus according to claim 3, further comprising:

fourth monitor means for monitoring the traffic on the communication lines between said terminal stations and for storing traffic monitoring information therein; and said data-base distribution manager means determining a communication route which is actually used for transferring the specified part of the data-base information on the basis of the traffic monitoring information.

5. The apparatus according to claim 4, wherein said data-base distribution manager means selects a first specific communication route from among a plurality of communication routes which connect said certain terminal station and a target terminal station which is said identified one of said other terminal stations and to which said part of said data-base information is to be transferred, said first specific communication route directly connecting said certain terminal station and said target terminal station to each other.

6. The apparatus according to claim 5, wherein said data-base distribution manager means selects a second specific communication route from among said plurality of communication routes when said first specific communication route is busy, said second specific communication route being constituted by communication lines which indirectly connect said certain terminal station and said target terminal station to each other and whose traffic is monitored by said fourth monitor means and detected to be less than a maximum permissible level.

7. The apparatus according to claim 5, wherein said data-base distribution manager means attempts to designate the same specific communication route again after an elapse of a predetermined time period when the first specific communication route is busy.

8. A distributed data-base communication system comprising:

a plurality of terminal stations including respective data-base devices;

communication lines for connecting said stations to one another so as to permit communication of any one of said terminal stations with any other thereof; and data-base load-distributing management devices provided respectively in each of said terminal stations, each of said data-base load-distributing management devices comprising, (i) internal load monitor means for monitoring an internal data-base access load resulting from data requests made of the respective terminal station to which said internal load monitor means belongs, and for detecting whether the internal access load exceeds a permissible level below which accessing to the data-base device does not overflow, (ii) external load monitor means for monitoring data-base access loads resulting from data requests made of others of said terminal stations, and for detecting whether each of the access loads of said others of said terminal stations exceeds the permissible level; and (iii) load distribution management means responsive to said internal load monitor means and said external load monitor means, for determining whether a part of the data-base information stored in the data-base device of one of the terminal stations has a high access frequency and is accessed by at least one of said others of said terminal stations, for specifying when the data-base access load of said one terminal station exceeds the permissible level, when the data-base access load of at least one of the others of the terminal stations does not exceed the permissible level, and when a part of the access load of the one terminal station has a high access frequency the external transfer of the part of the data-base information with a high access load, for identifying one of the others of said terminal station most frequently using the part of the data-base information with a high access frequency, for transferring the part of the data-base information with a high access frequency to the identified one of the others of the terminal stations identified as most frequently using the part of the data-base information when the access load of the identified one of said terminal stations does not exceed the permissible level, and for transferring the part of the data-base information with a high access frequency to another one of the others of said terminal station when the access load of the identified one of said terminal station is not less than the permissible level.

9. The system according to claim 8, wherein each of said data-base load-distributing management devices further comprises:
(iv) table data monitor means for monitoring an access history of accessing to said data-base device of said respective one terminal station by itself and by said others of said terminal stations.

10. The system according to claim 9, wherein each of said data-base load-distributing management devices further comprises:
(v) traffic monitor means for monitoring a current traffic level on each of said communication lines.

11. A method for automatically distributing data-base information between data-base devices of a plurality of terminal stations associated with one another by means of communication lines in a distributed data-base communication system, said method comprising the steps of:
monitoring a first data-base access load of a certain terminal station to detect whether the first data-base access load exceeds a permissible level below which accessing to the data-base device does not overflow;
monitoring second data-base access loads of others of said terminal stations to detect whether each of the second data-base access loads of said others of said terminal stations exceeds the permissible level;
determining whether a part of the data-base information of said certain terminal station has a high access frequency;
specifying, when said first data-base access load exceeds the permissible level, when the second data-base access load of at least one of said others of said terminal stations does not exceed the permissible level, and when a part of the data-base information of said certain terminal station has a high access frequency, the external transfer of the part of the data-base information with a high access frequency;
identifying one of said others of said terminal stations most frequently using said part of the data-base information with a high access frequency;
transferring the part of the data-base information with a high access frequency to the identified one of said others of said terminal stations identified in said identifying step when the second data-base access load of said identified one of said others of said terminal stations is less than the permissible level; and
transferring, when the second access load of said identified one is not less than the permissible level, said part of the data-base information with a high access frequency to another one of said others of said terminal stations whose second data-base access load is most light among the remaining others of said terminal stations.

12. The method according to claim 11, further comprising the steps of:
monitoring a use frequency of data-base information of the data-base device of said first terminal station and monitoring the history of the monitored data-base information as use frequency; and
at least partially specifying the data-base information to be externally transferred from said first terminal station in accordance with the use frequency.

13. The method according to claim 12, wherein a data-base information which is contained in the data-base information of said first terminal station and which is externally accessed more frequently than is internally accessed is detected and is determined as a data-base portion to be transferred.

14. The method according to claim 13, further comprising the steps of:
monitoring the traffic on said communication lines and maintaining the traffic monitoring information; and
determining a communication route which is actually used for transferring the data-base part to be transferred on the basis of the traffic monitoring information.

15. The method according to claim 14, wherein a first specific communication route is selected from among a plurality of communication routes through which said first terminal station and a target terminal station to which the data-base part is to be transferred are connected to each other, said first specific communication route directly connecting said first terminal station to said target terminal station.

16. The method according to claim 15, wherein a second specific communication route is selected from among said plurality of communication routes when said first specific communication route is busy, said second specific communication route being constituted by several communication lines which indirectly connect said first terminal station to said target terminal station and whose traffic is less than a maximum permissible level.

17. The method according to claim 15, wherein, when said first specific communication route is busy, an attempt is made to designate the same communication route again after an elapse of a predetermined time period.

* * * * *